United States Patent
Choi et al.

(10) Patent No.: US 12,319,312 B2
(45) Date of Patent: Jun. 3, 2025

(54) APPARATUS FOR GENERATING U-TURN PATH OF VEHICLE AND METHOD THEREOF

(71) Applicants: Kia Corporation, Seoul (KR); Hyundai Motor Company, Seoul (KR)

(72) Inventors: Sung Woo Choi, Seoul (KR); Su Jin Han, Seoul (KR); Su Young Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 422 days.

(21) Appl. No.: 18/052,564

(22) Filed: Nov. 3, 2022

(65) Prior Publication Data

US 2023/0347930 A1 Nov. 2, 2023

(30) Foreign Application Priority Data

Apr. 27, 2022 (KR) ........................ 10-2022-0052176

(51) Int. Cl.
*B60W 60/00* (2020.01)
*B60W 30/18* (2012.01)
*B60W 40/10* (2012.01)

(52) U.S. Cl.
CPC .... *B60W 60/001* (2020.02); *B60W 30/18009* (2013.01); *B60W 40/10* (2013.01); *B60W 2554/801* (2020.02)

(58) Field of Classification Search
CPC ......... B60W 60/001; B60W 30/18009; B60W 40/10; B60W 2554/801; B60W 30/18145; B60W 50/00; B60W 60/0011; B60W 30/10; B60W 40/105; B60W 40/107; B60W 2540/18; B60W 2552/30; B60W 2556/40; B60W 2720/10
USPC .......................................................... 701/23
See application file for complete search history.

(56) References Cited

U.S. PATENT DOCUMENTS

| | | | |
|---|---|---|---|
| 2015/0198953 A1* | 7/2015 | Peake | B62D 15/025 701/23 |
| 2016/0052546 A1* | 2/2016 | Arakane | G05D 1/027 701/41 |
| 2017/0247032 A1* | 8/2017 | Lee | B60W 30/12 |
| 2018/0297606 A1* | 10/2018 | Luo | G01G 19/021 |
| 2019/0009778 A1* | 1/2019 | Schein | B60W 40/04 |
| 2019/0033874 A1* | 1/2019 | Berkemeier | A01B 69/008 |
| 2021/0123750 A1* | 4/2021 | Im | G01C 21/3407 |
| 2021/0221355 A1* | 7/2021 | Kang | B62D 15/025 |

FOREIGN PATENT DOCUMENTS

| | | |
|---|---|---|
| JP | 2006190237 A | 7/2006 |
| JP | 2009157490 A | 7/2009 |

* cited by examiner

*Primary Examiner* — Muhammad Shafi
(74) *Attorney, Agent, or Firm* — Slater Matsil, LLP

(57) ABSTRACT

In an embodiment an apparatus includes a path generator provided in a vehicle, wherein the path generator is configured to generate, based on a minimum turning radius of the vehicle, a default U-turn path and to generate a final U-turn path based on a path following control reference point of the vehicle which is based on the generated default U-turn path, and a controller configured to control autonomous driving of the vehicle to follow the generated final U-turn path.

18 Claims, 14 Drawing Sheets

APPARATUS FOR GENERATING U-TURN PATH OF VEHICLE AND METHOD THEREOF

CROSS-REFERENCE TO RELATED APPLICATIONS

This application claims the benefit of priority to Korean Patent Application No. 10-2022-0052176, filed in the Korean Intellectual Property Office on Apr. 27, 2022, the entire contents of which is incorporated herein by reference.

TECHNICAL FIELD

The present disclosure relates to an apparatus for generating a U-turn path of a vehicle and a method thereof, and more particularly, relates to an apparatus and a method for generating a U-turn path following during autonomous driving.

BACKGROUND

An autonomous vehicle is a vehicle loaded with an autonomous driving technology capable of performing driving, braking, and steering on behalf of its driver to reduce the fatigue of the driver. The autonomous vehicle may generate various paths in a driving situation, may follow the various paths to perform autonomous driving. A U-turn path is also included in such various paths.

However, an existing technology generates a U-shaped path in which a kinematic characteristic of the vehicle is not considered and follows the generated U-shaped path to perform autonomous driving. In general, the autonomous vehicle performs autonomous driving to follow a path on the basis of a center point of a front bumper of the vehicle, in the process of performing path estimation control, whereas the previously generated U-shaped path is generated on the basis of the center of a rear wheel axle of the vehicle. Thus, as a reference point for path generation and a reference point for path following are different from each other, a difficulty occurs in a process where the autonomous vehicle performs following control in terms of path shape and curvature.

SUMMARY

Embodiments provide solutions to the above-mentioned problems occurring in the prior art while advantages achieved by the prior art are maintained.

Embodiments provide an apparatus and a method for generating a U-turn path following during autonomous driving.

Further embodiments provide an apparatus and a method for generating a U-turn path considering a kinematic characteristic of an autonomous vehicle.

Various embodiments provide an apparatus for generating a U-turn path of a vehicle to match a path generation reference point with a following control reference point and a method thereof.

Other embodiments provide an apparatus for generating a U-turn path of a vehicle to enhance path following performance in a process where an autonomous vehicle makes a U-turn and a method thereof.

Yet other embodiments provide an apparatus for generating a U-turn path of a vehicle to improve lateral control following performance of the vehicle by generating a U-turn path considering a minimum turning radius of the vehicle and a method thereof.

According to embodiments of the present disclosure, an apparatus for generating a U-turn path of a vehicle may include a path generator provided in the vehicle to generate a default U-turn path, based on a minimum turning radius of the vehicle and generate a final U-turn path which is on the basis of a path following control reference point of the vehicle, based on the generated default U-turn path, and a controller that controls autonomous driving of the vehicle to follow the generated final U-turn path.

In an embodiment, the path following control reference point may include a center point of a front bumper of the vehicle.

In an embodiment, the path generator may determine a section where a U-turn is possible, based on information about a high definition map around the vehicle, and may determine a start point of the default U-turn path, based on the section where the U-turn is possible.

In an embodiment, the path generator may generate the default U-turn path, based on the minimum turning radius which is on the basis of the center of a rear wheel axle of the vehicle.

In an embodiment, the path generator may generate the default U-turn path, based on the minimum turning radius determined based on a maximum steering angle of the vehicle.

In an embodiment, the path generator may determine a lane where a U-turn is ended, based on a lateral distance from a lane where the U-turn is started and the minimum turning radius.

In an embodiment, the path generator may generate the default U-turn path including a first clothoid path connected with a start point of the default U-turn path, a second clothoid path connected with an end point of the default U-turn path, and an arc path connected between the first clothoid path and the second clothoid path.

In an embodiment, the path generator may generate the arc path having the minimum turning radius as a radius.

In an embodiment, the controller may generate the default U-turn path to be symmetrical left and right in a lateral direction.

In an embodiment, the controller may control a speed at which the vehicle enters a point where a U-turn is started, with regard to a time taken to maximum steering of the vehicle and a length of the first clothoid path.

In an embodiment, the controller may determine an upper limit of an acceleration of the vehicle for the first clothoid path, with regard to a time taken to maximum steering of the vehicle, a length of the first clothoid path, and a speed at which the vehicle enters a point where a U-turn is started and may control the autonomous driving of the vehicle, with regard to the upper limit of the acceleration.

In an embodiment, the path generator may calculate a heading direction of the vehicle, the heading direction corresponding to a point making up the default U-turn path, may calculate a position of the path following control reference point corresponding to the point making up the default U-turn path, with regard to the heading direction, and may generate the final U-turn path, based on the calculated position of the path following control reference point corresponding to the point making up the default U-turn path.

According to other embodiments of the present disclosure, a method for generating a U-turn path of a vehicle may include generating, by a path generator provided in the vehicle, a default U-turn path, based on a minimum turning radius of the vehicle, generating, by the path generator, a final U-turn path which is on the basis of a path following control reference point of the vehicle, based on the generated default U-turn path, and controlling, by the controller, autonomous driving of the vehicle to follow the generated final U-turn path.

In an embodiment, the generating of the default U-turn path by the path generator may include determining, by the path generator, a section where a U-turn is possible, based on information about a high definition map around the vehicle, and determining, by the path generator, a start point of the default U-turn path, based on the section where the U-turn is possible.

In an embodiment, the generating of the default U-turn path by the path generator may include generating, by the path generator, the default U-turn path, based on the minimum turning radius which is on the basis of the center of a rear wheel axle of the vehicle.

In an embodiment, the generating of the default U-turn path by the path generator may include determining, by the path generator, a lane where a U-turn is ended, based on a lateral distance from a lane where the U-turn is started and the minimum turning radius.

In an embodiment, the generating of the default U-turn path by the path generator may include generating, by the path generator, the default U-turn path including a first clothoid path connected with a start point of the default U-turn path, a second clothoid path connected with an end point of the default U-turn path, and an arc path connected between the first clothoid path and the second clothoid path.

In an embodiment, the controlling of the autonomous driving of the vehicle by the controller may include controlling, by the controller, a speed at which the vehicle enters a point where a U-turn is started, with regard to a time taken to maximum steering of the vehicle and a length of the first clothoid path.

In an embodiment, the controlling of the autonomous driving of the vehicle by the controller may include determining, by the controller, an upper limit of an acceleration of the vehicle for the first clothoid path, with regard to a time taken to maximum steering of the vehicle, a length of the first clothoid path, and a speed at which the vehicle enters a point where a U-turn is started and controlling, by the controller, the autonomous driving of the vehicle, with regard to the upper limit of the acceleration.

In an embodiment, the generating of the final U-turn path by the path generator may include calculating, by the path generator, a heading direction of the vehicle, the heading direction corresponding to a point making up the default U-turn path, calculating, by the path generator, a position of the path following control reference point corresponding to the point making up the default U-turn path, with regard to the heading direction, and generating, by the path generator, the final U-turn path, based on the calculated position of the path following control reference point corresponding to the point making up the default U-turn path.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
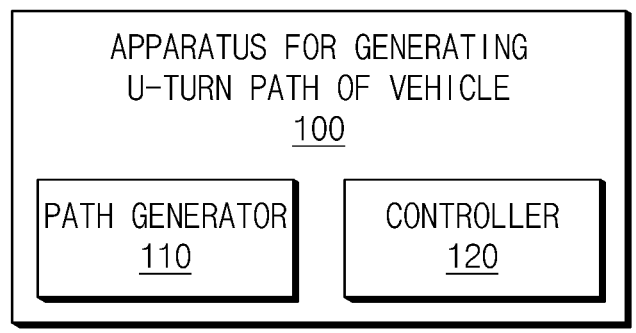
FIG. 1 is a block diagram illustrating an apparatus for generating a U-turn path of a vehicle according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 12.

FIG. 1 is a block diagram illustrating an apparatus for generating a U-turn path of a vehicle according to an embodiment of the present disclosure.

An apparatus 100 for generating a U-turn path of a vehicle according to an embodiment of the present disclosure may be implemented inside or outside the vehicle. In this case, the apparatus 100 for generating the U-turn path of the vehicle may be integrally configured with control units in the vehicle or may be implemented as a separate hardware device to be connected with the control units of the vehicle by a connection means.

As an example, the apparatus 100 for generating the U-turn path of the vehicle may be integrally configured with the vehicle or may be implemented as a configuration independent of the vehicle in the form of being installed/attached to the vehicle. Alternatively, a part of the apparatus 100 for generating the U-turn path of the vehicle may be integrally configured with the vehicle or the other may be implemented as a configuration independent of the vehicle in the form of being installed/attached to the vehicle.

Referring to FIG. 1, the apparatus 100 for generating the U-turn path of the vehicle may include a path generator 110 and a controller 120.

The path generator 110 and the controller 120 may include a processor which performs data processing and/or calculation described below. Furthermore, the path generator no and the controller 120 may include a memory which stores data or an algorithm required in a process of performing data processing and/or calculation.

The processor which may be included in the path generator 110 and the controller 120 may be an electric circuit which executes a command of software. For example, the processor included in the path generator 110 and the controller 120 may be an electronic control unit (ECU), a micro controller unit (MCU), or another sub-controller.

The memory which may be included in the path generator 110 and the controller 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The path generator 110 may be provided in the vehicle to generate a default U-turn path, based on a minimum turning radius of the vehicle.

Herein, the minimum turning radius of the vehicle may be determined based on a maximum steering angle of the vehicle with respect to a center point of a rear wheel axle of the vehicle. When the vehicle travels while maintaining a specific steering angle, a driving path in the form of an arc formed around a specific point may be formed. At this time, as the specific steering angle is larger, an arc path with a smaller turning radius may be formed.

Thus, the path generator 110 may calculate an arc path formed when the vehicle travels using a maximum steering angle and may calculate a turning radius of the calculated arc path as the minimum turning radius.

As an example, the path generator 110 may generate a default U-turn path, based on the minimum turning radius determined based on the maximum steering angle of the vehicle.

An arc path of a different turning radius may be formed according to which feature point of the vehicle it is on the basis of. Illustratively, the path generator 110 may calculate a minimum turning radius corresponding to the arc path which is on the basis of a midpoint of a rear wheel axle of the vehicle in the process of generating the default U-turn path. However, the present disclosure is not limited thereto. The path generator 110 may calculate a minimum turning radius corresponding to an arc path which is on the basis of a specific point of another vehicle rather than the midpoint of the rear wheel axle of the vehicle.

As an example, the path generator 110 may generate the default U-turn path, based on the minimum turning radius which is on the basis of the center of the rear wheel axle of the vehicle.

As an example, the path generator 110 may determine a section where a U-turn is possible, based on information about a high definition map around the vehicle and may determine a start point of the default U-turn path, based on the section where the U-turn is possible.

As an example, the path generator 110 may be configured to be connected with a memory which stores information about a high definition map around the vehicle. The path generator 110 may determine the section where the U-turn is possible, based on the information about the high definition map around the vehicle, which is stored in the connected memory.

A description will be given in detail below of detailed contents where the path generator 110 determines the section where the U-turn is possible and determines the start point of the default U-turn path with reference to FIG. 2.

As an example, the path generator 110 may determine a lane where the U-turn is ended, based on a lateral distance from a lane where the U-turn is started and the minimum turning radius.

As an example, the path generator 110 may determine a lane, which is closest to the lane where the U-turn is started in a lateral distance, among opposite lanes where the lateral distance is greater than two times the minimum turning radius from a centerline of the lane where the U-turn is started, as the lane where the U-turn is ended.

As an example, the path generator 110 may generate the default U-turn path including a first clothoid path connected with a start point of the default U-turn path, a second clothoid path connected with an end point of the default U-turn path, and an arc path connected between the first clothoid path and the second clothoid path.

The end point of the default U-turn path may refer to the foot of perpendicular on the centerline of the lane where the U-turn is ended from a point where the section where the U-turn is possible is started or the start point of the default U-turn path and may be calculated by the path generator 110.

As an example, the path generator 110 may generate an arc path having the minimum turning radius as a radius.

As an example, the path generator 110 may generate the default U-turn path to be symmetrical left and right in the lateral direction.

A description will be given in detail below of detailed contents where the path generator 110 generates the default U-turn path with reference to FIGS. 6 to 8.

The path generator 110 may generate a final U-turn path which is on the basis of a path following control reference point of the vehicle, based on the generated default U-turn path.

As an example, the path following control reference point may include a center point of a front bumper of the vehicle. When the path following control process of the vehicle is performed on the basis of another point rather than the center point of the front bumper of the vehicle, the path generator 110 may generate the final U-turn path which is on the basis of the other point which is a criterion of path following control.

As an example, the path generator 110 may calculate a heading direction of the vehicle, which corresponding to a point making up the default U-turn path, may calculate a position of the path following control reference point corresponding to the point making up the default U-turn path, and may calculate the final U-turn path, based on the calculated position of the path following control reference point corresponding to the point making up the default U-turn path.

A description will be given in detail below of detailed contents where the path generator 110 calculates the heading direction of the vehicle, which corresponds to the point making up the default U-turn path, with reference to FIG. 9.

As an example, the path generator 110 may calculate a point where each point making up the default U-turn path is moved in the heading direction corresponding to each point by a distance from the rear wheel axle of the vehicle to the front bumper.

The path generator 110 may calculate the final U-turn path including the calculated points moved to correspond to the respective points making up the default U-turn path.

A description will be given in detail below of detailed contents where the path generator 110 calculates the point where each point making up the default U-turn path is moved in the heading direction corresponding to each point by the distance from the rear wheel axle of the vehicle to the front bumper with reference to FIG. 10.

The controller 120 may perform the overall control such that respective components may normally perform their own functions. Such a controller 120 may be implemented in the form of hardware, may be implemented in the form of software, or may be implemented in the form of a combination thereof. Preferably, the controller 120 may be implemented as, but not limited to, a microprocessor. In addition, the controller 120 may perform a variety of data processing, calculation, and the like described below.

The controller 120 may control autonomous driving of the vehicle to follow the generated final U-turn path.

As an example, the controller 120 may control driving, braking, and steering of the vehicle to follow the generated final U-turn path. As an example, the controller 120 may control driving, braking, and steering of the vehicle, based on various path following control algorithms.

As an example, the controller 120 may control a speed at which the vehicle enters the point where the U-turn is started, with regard to a time taken to maximum steering of the vehicle and a length of the first clothoid path.

In detail, the controller 120 may control the speed at which the vehicle enters the point where the U-turn is started, such that maximum steering is possible while the vehicle is traveling at a constant speed on a section on a final U-turn path corresponding to the first clothoid path.

The controller 120 may control the speed at which the vehicle enters the point where the U-turn is started, such that a time when the vehicle travels at a constant speed on the section on the final U-turn path corresponding to the first clothoid is greater than or equal to a time taken to the maximum steering.

First of all, the controller 120 may calculate a time taken to the maximum steering by dividing a maximum steering angle of the vehicle by a maximum steering angular speed.

The controller 120 may control the speed at which the vehicle enters the point where the U-turn is started to be less than or equal to a speed obtained by dividing a length of the section on the final U-turn path corresponding to the first clothoid path by the time taken to the maximum steering. The length of the section on the final U-turn path corresponding to the first clothoid path may be approximated as a length of the first clothoid path on the default U-turn path or a straight-line distance in a lane direction of the first clothoid path.

When the speed at which the vehicle enters the point where the U-turn is started is determined to be equal to the speed obtained by dividing the length of the section on the final U-turn path corresponding to the first clothoid path by the time taken to the maximum steering, a time taken to travel may be minimized.

As an example, the controller 120 may calculate the speed at which the vehicle enters the point where the U-turn is started, based on Equation 1 below.

$$Vo\_desired = x\_max/Td, \ a\_desired = o \quad \text{[Equation 1]}$$

Herein, Vo_desired may refer to the control target value of the speed at which the vehicle enters the point where the U-turn is started, x_max may refer to the length of the first clothoid path or the approximate value thereof, Td may refer to the time taken to the maximum steering of the vehicle, and a_desired may refer to the acceleration while the vehicle is traveling on the first clothoid path.

As an example, the controller 120 may determine an upper limit of an acceleration of the vehicle for the first clothoid path, with regard to the time taken to the maximum steering of the vehicle, the length of the first clothoid path, and the speed at which the vehicle enters the point where the U-turn is started, and may control autonomous driving of the vehicle, with regard to the upper limit of the acceleration.

In detail, the controller 120 may control an acceleration of the vehicle such that maximum steering is possible while the vehicle is traveling at a constant acceleration on the section on the final U-turn path corresponding to the first clothoid path.

The controller 120 may control the acceleration at which the vehicle travels on the section on the final U-turn path corresponding to the first clothoid path such that the time when the vehicle travels at the constant acceleration on the section on the final U-turn path corresponding to the first clothoid path is greater than or equal to the time taken to the maximum steering.

When the acceleration where the vehicle travels on the section on the final U-turn path corresponding to the first clothoid path is determined such that the time when the vehicle travels at the constant acceleration on the section on the final U-turn path corresponding to the first clothoid path is greater than or equal to the time taken to the maximum steering, a time taken to travel may be minimized.

As an example, the controller 120 may calculate the acceleration where the vehicle travels on the section on the final U-turn path corresponding to the first clothoid path, based on Equation 2 below.

$$a\_desired <= (x\_max - Vo*Td)*2/Td^2 \quad \text{[Equation 2]}$$

Herein, a_desired may refer to the control target value of the acceleration at which the vehicle travels on the section on the final U-turn path corresponding to the first clothoid path, x_max may refer to the length of the first clothoid path or an approximate value thereof, Vo may refer to the speed at which the vehicle enters the point where the U-turn is started, and Td may refer to the time taken to the maximum steering of the vehicle.

Only the case where the vehicle travels at the constant speed or the constant acceleration on the section on the final U-turn path corresponding to the first clothoid path is exemplified. However, as another embodiment, the controller 120 may control the speed at which the vehicle enters the point where the U-turn is started and the acceleration while the vehicle is traveling on the section on the final U-turn path corresponding to the first clothoid path such that maximum steering is possible while the vehicle is traveling the section on the final U-turn path corresponding to the first clothoid path.

Figure 2:
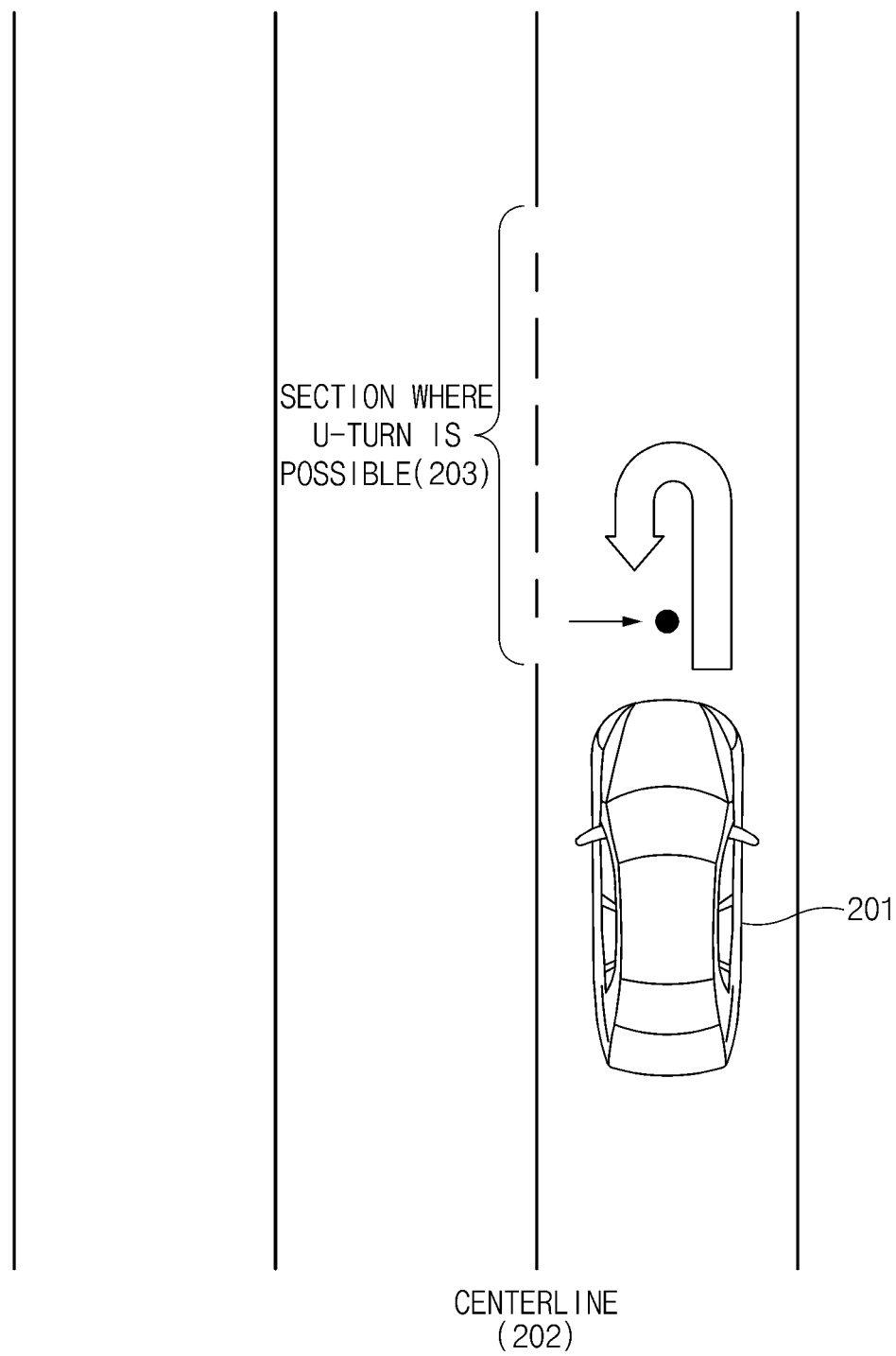
FIG. 2 is a drawing illustrating that an apparatus for generating a U-turn path of a vehicle determines a section where a U-turn is possible according to an embodiment of the present disclosure.

FIG. 2 is a drawing illustrating that an apparatus for generating a U-turn path of a vehicle determines a section 203 where a U-turn is possible according to an embodiment of the present disclosure.

An operation described as being performed by the apparatus for generating the U-turn path of the vehicle in FIGS. 2 to 11 may be understood as being performed by a path generator included in the apparatus for generating the U-turn path of the vehicle.

The apparatus for generating the U-turn path of the vehicle may determine a section 203 where a U-turn is possible, based on information about a surrounding high definition map, which is stored in its memory.

The information about the surrounding high definition map may include information about at least one of a line type for the road around the vehicle, a line color for the road, or whether a U-turn assigned to a specific section of the road is possible.

As an example, the apparatus for generating the U-turn path of the vehicle may determine the section 203 where the U-turn is possible, using the information about the at least one of the line type for the road around the vehicle, the line color for the road, or whether the U-turn assigned to the specified section of the road is possible, which is included in the information about the surrounding high definition map.

As an example, the apparatus for generating the U-turn path of the vehicle may obtain information about a global path of a vehicle 201 from various peripheral devices of the vehicle 201. As an example, the various peripheral devices may include navigation.

As an example, the apparatus for generating the U-turn path of the vehicle may determine the section 203 where the U-turn is possible, using the information about the surrounding high definition map, based on information about a global path to a destination of the vehicle 201.

As an example, the apparatus for generating the U-turn path of the vehicle may determine a point of the foot of perpendicular, from a point where the section 203 where the U-turn is possible is started in a driving direction of the vehicle 201 to the centerline of an ego-lane (or a lane where the U-turn is started), as a start point of a default U-turn path.

The lane where the U-turn is started may be determined as a lane closest to a centerline 202 on a road where the vehicle 201 is traveling.

Figure 3A:
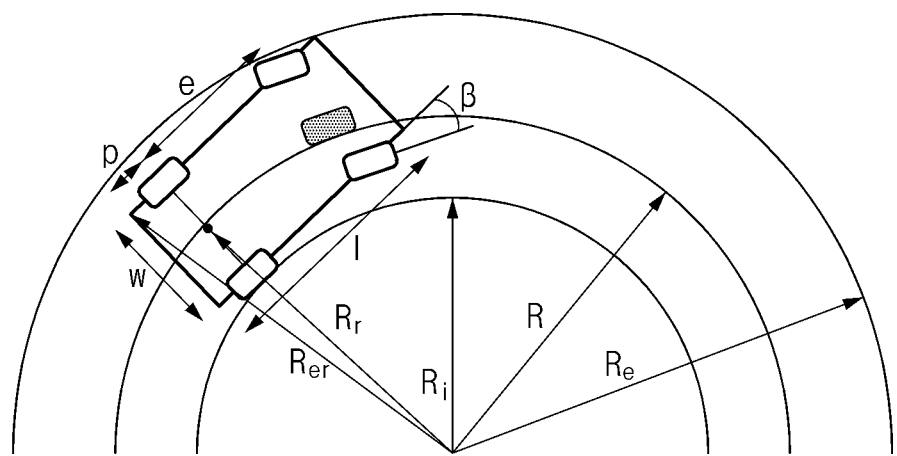
FIGS. 3A, 3B and 3C drawings illustrating that an apparatus for generating a U-turn path of a vehicle calculates a minimum turning radius according to an embodiment of the present disclosure.
Figure 3B:
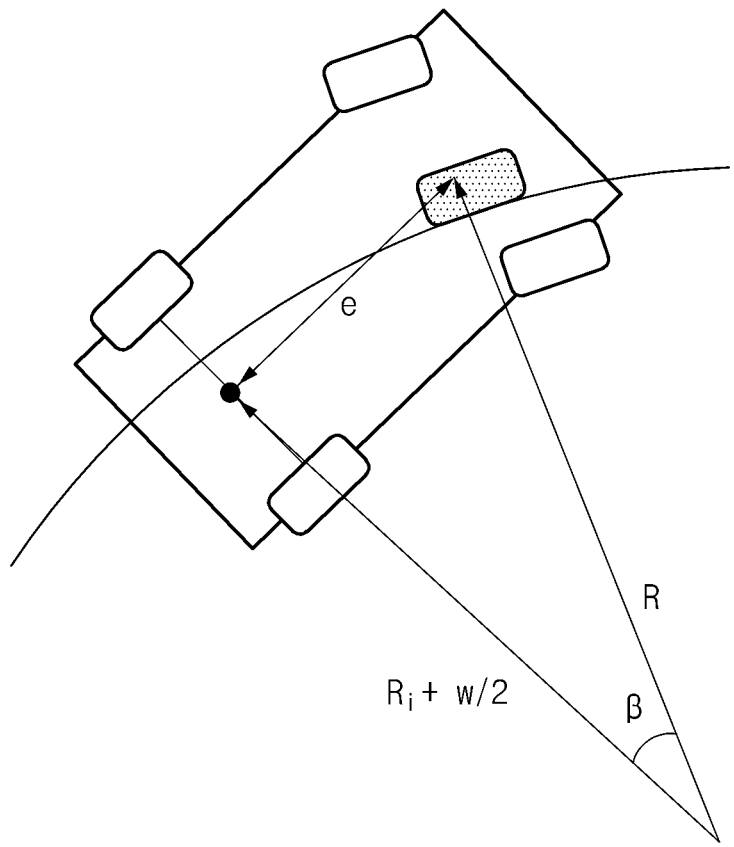
Figure 3C:
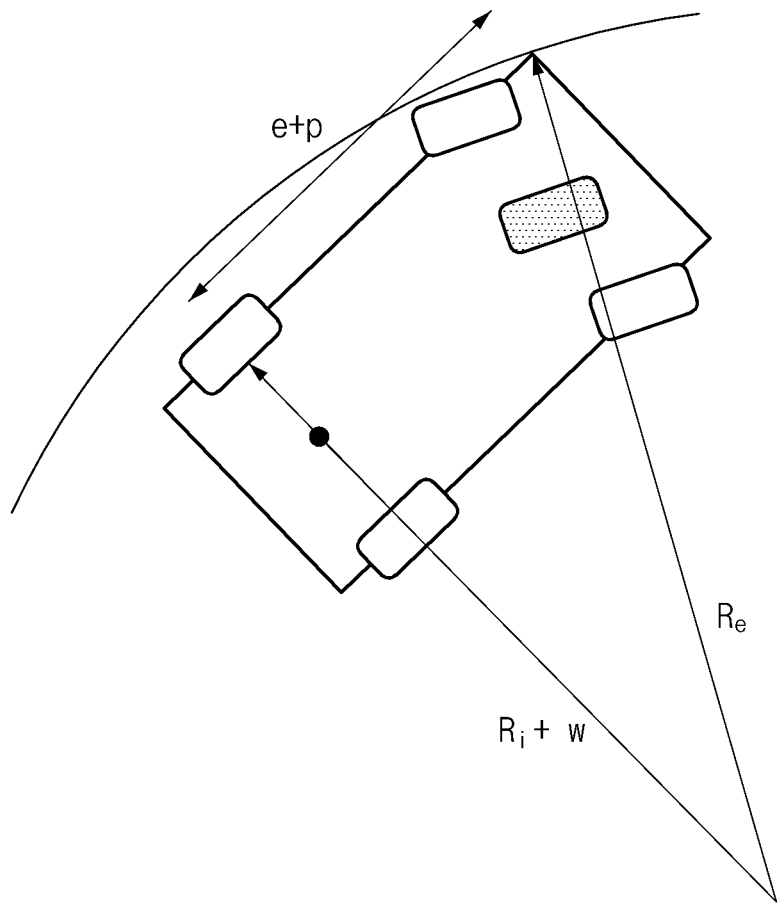

FIGS. 3A to 3C drawings illustrating that an apparatus for generating a U-turn path of a vehicle calculates a minimum turning radius according to an embodiment of the present disclosure.

The apparatus for generating the U-turn path of the vehicle may calculate a minimum turning radius corresponding to a specific point of the vehicle with regard to a kinematic characteristic of the vehicle.

As an example, the apparatus for generating the U-turn path of the vehicle may calculate the minimum turning radius corresponding to the specific point of the vehicle, based on Equation 3 below.

$$R = \frac{e}{\sin\beta}$$ [Equation 3]
$$R_i = \sqrt{R^2 - e^2} - \frac{w}{2} = \frac{e}{\tan\beta} - \frac{w}{2}$$
$$R_e = \sqrt{(R_i + w)^2 + (e + p)^2}$$
$$R_r = R_i + \frac{w}{2}$$
$$R_{er} = \sqrt{(R_i + w)^2 + p^2}$$

Herein, R may refer to the minimum turning radius calculated on the basis of the center point of the front wheel axle, e may refer to the wheelbase, and $\beta$ may refer to the maximum steering angle.

$R_i$ may refer to the minimum turning radius calculated on the basis of the inner rear wheel and w may refer to the vehicle width.

$R_e$ may refer to the minimum turning radius calculated on the basis of the outermost point of the front bumper and p may refer to the overhang of the vehicle. The overhang may refer to the distance between the front wheel axle of the vehicle and the front end of the vehicle or the distance between the rear wheel axle of the vehicle and the rear end of the vehicle.

$R_r$ may refer to the minimum turning radius calculated on the basis of the center point of the rear wheel axle.

$R_{er}$ may refer to the minimum turning radius calculated on the basis of the outermost point of the rear bumper.

According to an embodiment, the apparatus for generating the U-turn path of the vehicle may calculate the minimum turning radius on the basis of various points of the vehicle, for example, R, $R_i$, $R_e$, $R_r$, or $R_{er}$ defined in Equation 3 above and may calculate a default U-turn path based on the calculated minimum turning radius.

Figure 4:
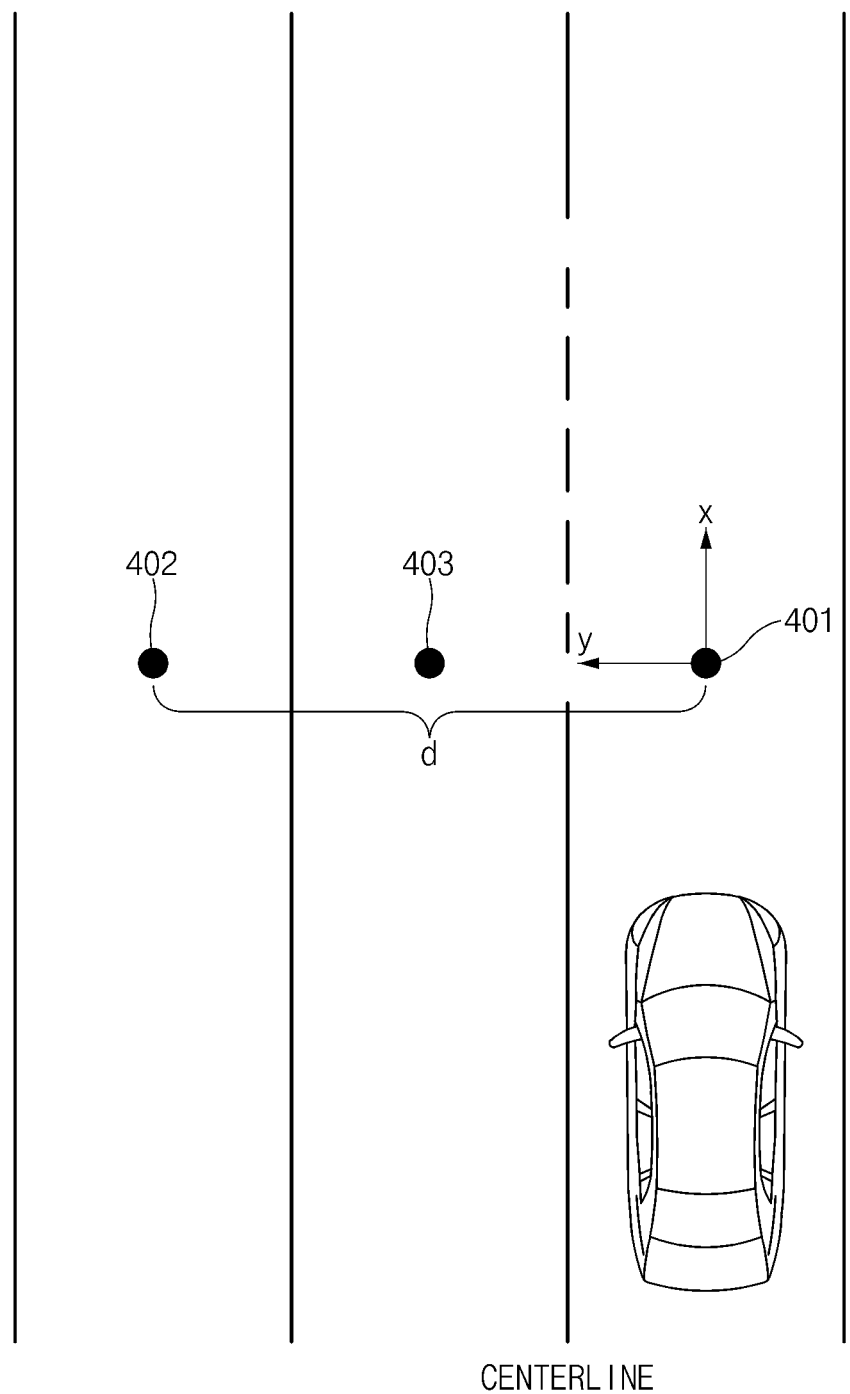
FIG. 4 is a drawing illustrating that an apparatus for generating a U-turn path of a vehicle calculates the center of an arc path according to an embodiment of the present disclosure.

FIG. 4 is a drawing illustrating that an apparatus for generating a U-turn path of a vehicle calculates the center of an arc path according to an embodiment of the present disclosure.

The apparatus for generating the U-turn path of the vehicle may determine a point of the foot of perpendicular, from a point where a section where a U-turn is possible is started to the centerline of a lane where the U-turn is started, as a start point 401 of a default U-turn path.

The apparatus for generating the U-turn path of the vehicle may set the start point 401 of the default U-turn path to the origin, may set an existing driving direction to an x-axis, may set a direction of a lane where the U-turn is ended, which is perpendicular to the x-axis, to a y-axis, thus calculating a U-turn path.

The apparatus for generating the U-turn path of the vehicle may determine a lane, which is closest to a lane where the U-turn is started in a lateral distance (or a y-axis direction), among opposite lanes where the lateral distance is greater than two times the minimum turning radius from a centerline of the lane where the U-turn is started, as a lane where the U-turn is ended.

The apparatus for generating the U-turn path of the vehicle may calculate the foot of perpendicular, on the centerline of the lane where the U-turn is ended from the point where the section where the U-turn is possible is started or the start point 401 of the default U-turn path, as an end point 402 of the default U-turn path.

Furthermore, the apparatus for generating the U-turn path of the vehicle may calculate a midpoint 403 between the start point 401 of the default U-turn path and the end point 402 of the default U-turn path and may generate an arc path such that a point having the same y coordinate as the calculated midpoint 403 becomes the center of the arc path included in the default U-turn path. At this time, a distance between the start point 401 of the default U-turn path and the end point 402 of the default U-turn path may be d.

In other words, the apparatus for generating the U-turn path of the vehicle may determine a y coordinate of the calculated midpoint 403 between the start point 401 of the default U-turn path and the end point 402 of the default U-turn path as a y coordinate of the center of the arc path.

Figure 5:
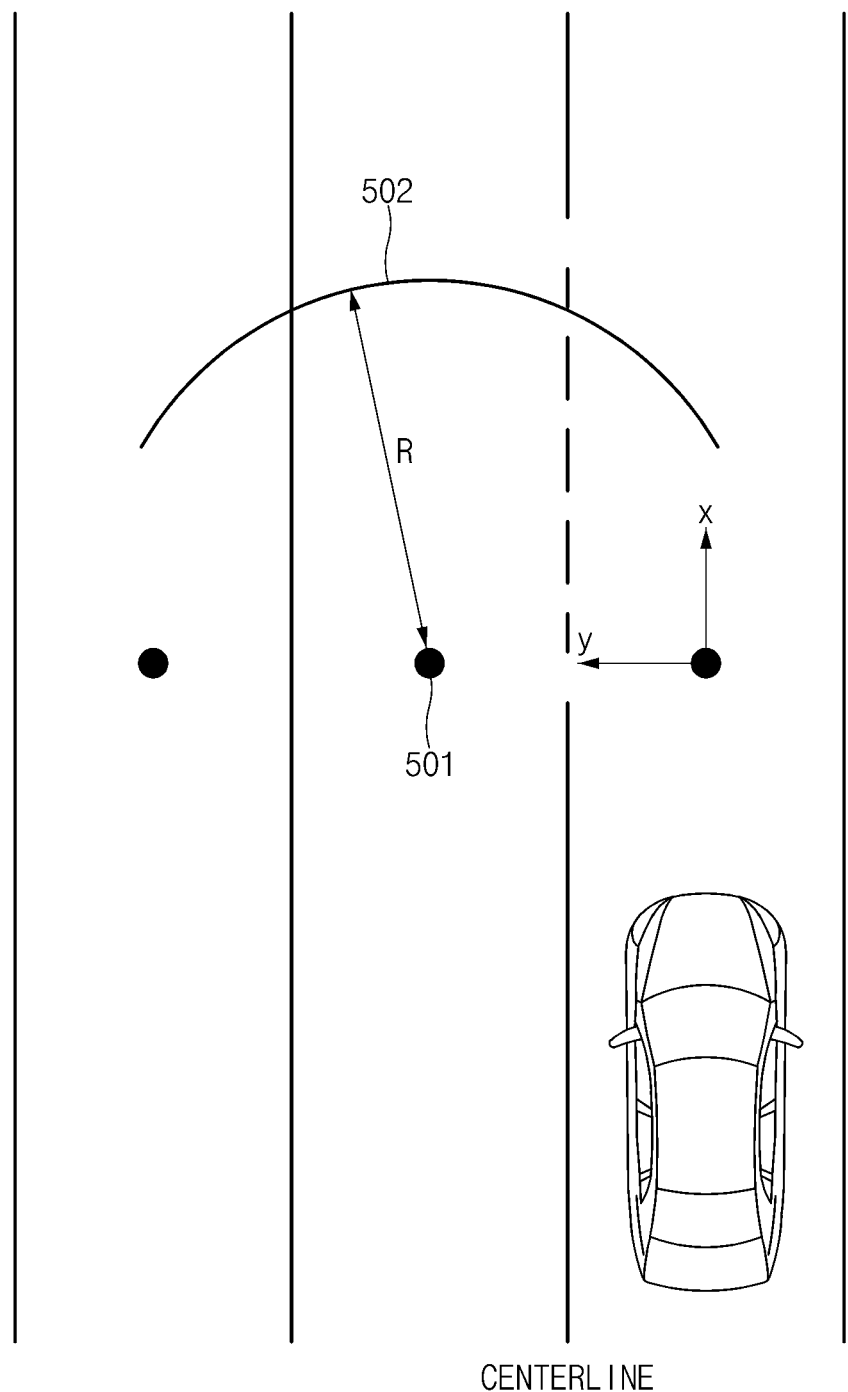
FIG. 5 is a drawing illustrating that an apparatus for generating a U-turn path of a vehicle calculates a radius of an arc path according to an embodiment of the present disclosure.

FIG. 5 is a drawing illustrating that an apparatus for generating a U-turn path of a vehicle calculates a radius of an arc path according to an embodiment of the present disclosure.

The apparatus for generating the U-turn path of the vehicle may determine a radius R of an arc path 502 included in a default U-turn path.

As an example, the apparatus for generating the U-turn path of the vehicle may determine a minimum turning radius calculated on the basis of a rear wheel axle of the vehicle as the radius R of the arc path 502.

The apparatus for generating the U-turn path of the vehicle may first determine the radius R of the arc path 502 to be generated and a y coordinate of an arc path center 501 and may calculate an x coordinate of the arc path center 501 with regard to the radius R of the arc path 502 and the y coordinate of the arc path center 501 to be connected with a first clothoid path and the second clothoid path.

Figure 6:
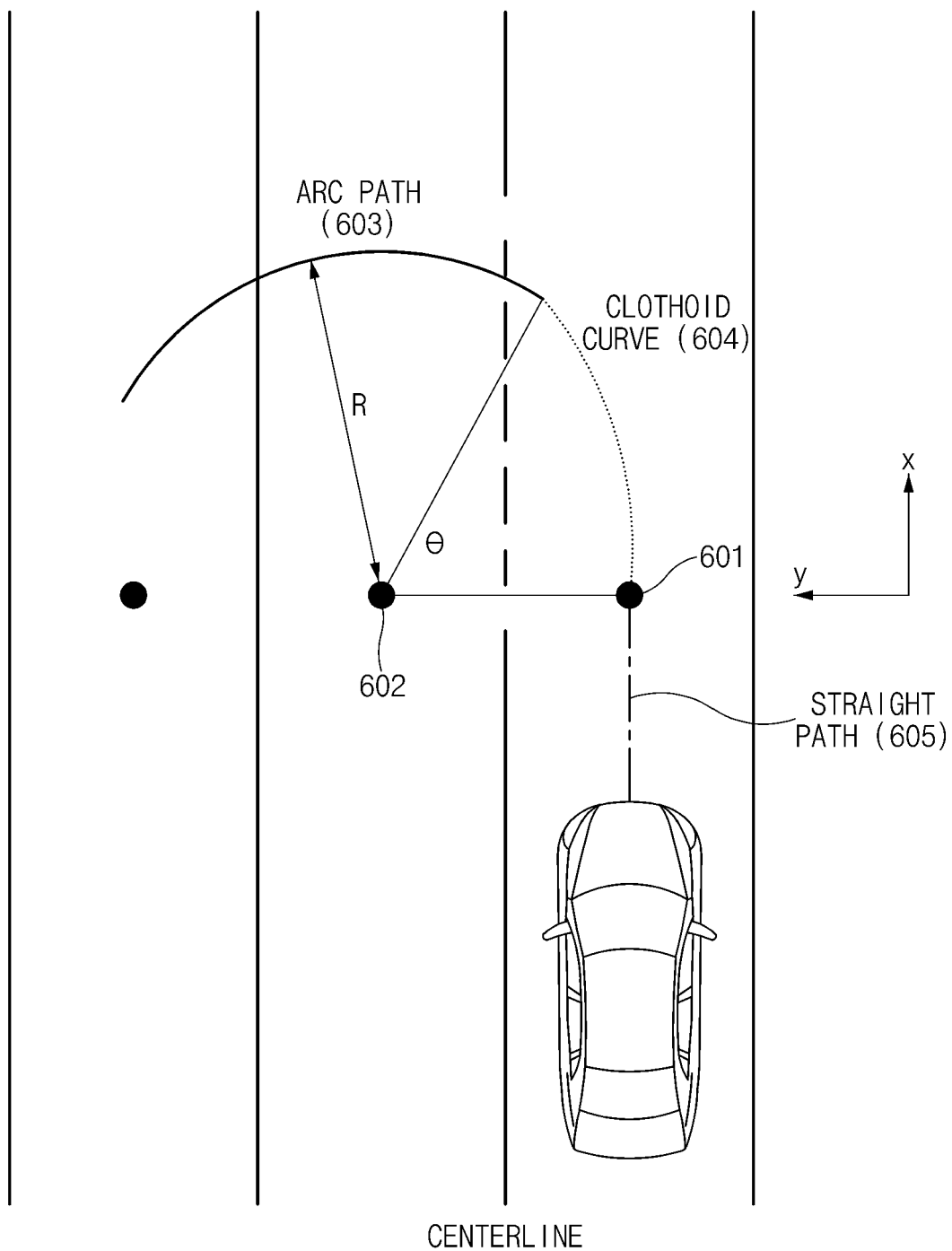
FIG. 6 is a drawing illustrating that an apparatus for generating a U-turn path of a vehicle generates a clothoid path according to an embodiment of the present disclosure.

FIG. 6 is a drawing illustrating that an apparatus for generating a U-turn path of a vehicle generates a clothoid path according to an embodiment of the present disclosure.

The apparatus for generating the U-turn path of the vehicle may calculate a clothoid curve 604 connected with a straight path 605 at a start point 601 of a default U-turn path as a first clothoid path.

The clothoid curve 604 may be a mitigation path which connects the straight path 605 with the arc path 603.

The apparatus for generating the U-turn path of the vehicle may calculate the approximated clothoid curve 604, by means of Equation 4 below.

$$y = \frac{x^3}{6 \cdot R \cdot L}$$  [Equation 4]

Equation 4 above may be a formula derived as the length of the clothoid curve 604 from the start point to a specific point is approximated as a distance in an x-axis direction from the start point.

Herein, y may refer to the y coordinate of the point making up the clothoid curve 604, x may refer to the x coordinate of the point making up the clothoid curve 604, R may refer to the radius of the arc path 603, and L may refer to the length of the clothoid curve 604 from the start point and the point making up the clothoid curve 604.

Particularly, when the clothoid curve 604 is short, the length of the clothoid curve 604 from the start point to the specific point may be approximated as the distance in the x-axis direction from the start point.

The apparatus for generating the U-turn path of the vehicle may generate the clothoid curve 604 to a point connected with the arc path 603 which has the radius R on the basis of the center 602 of the calculated arc path 603. Prior to this, the apparatus for generating the U-turn path of the vehicle may calculate coordinates of a point at which the arc path 603 and the clothoid curve 604 are connected with each other.

As an example, the apparatus for generating the U-turn path of the vehicle may calculate coordinates of the point at which the arc path 603 and the clothoid curve 604 are connected with each other such that the slope of the arc path 603 and the slope of the clothoid curve 604 are continuous.

As an example, the apparatus for generating the U-turn path of the vehicle may calculate a slope at a specific point of the clothoid curve 604 using Equation 5 below, which is derived by differentiating Equation 4 above, in the process of calculating the coordinates of the point at which the arc path 603 and the clothoid curve 604 are connected with each other.

$$x^2 = 2 \cdot R \cdot L \cdot \tan(\theta)$$  [Equation 5]

Herein, x may refer to the x coordinate of the specific point of the clothoid curve 604, R may refer to the radius of the arc path 603, L may refer to the length of the clothoid curve 604 from the start point to the specific point of the clothoid curve 604, and tan(θ) may refer to the slope at the specific point of the clothoid curve 604.

As another example, the apparatus for generating the U-turn path of the vehicle may calculate the slope at the specific point of the clothoid curve 604 using Equation 6 below, which is calculated as x and L are approximated as the same value in Equation 5 above, in the process of calculating the coordinates of the point at which the arc path 603 and the clothoid curve 604 are connected with each other.

$$x = 2 \cdot R \cdot \tan(\theta)$$  [Equation 6]

Herein, x may refer to the x coordinate of the specific point of the clothoid curve 604, R may refer to the radius of the arc path 603, and tan(θ) may refer to the slope at the specific point of the clothoid curve 604.

As an example, the apparatus for generating the U-turn path of the vehicle may calculate an x coordinate of the center of the arc path 603, such that there are a specific point on the clothoid curve 604 and a specific point on the arc path 603, which have the same slope tan(θ), the same x coordinate, and the same y coordinate.

The apparatus for generating the U-turn path of the vehicle may calculate the center of the arc path 603, based on the x coordinate of the center of the arc path 603, which is calculated such that the slope of the arc path 603 and the slope of the clothoid curve 604 are continuous at the connected point, and the y coordinate of the center of the arc path 603, which is the same as the y coordinate of the midpoint between the start point and the end point of the default U-turn path.

Furthermore, the apparatus for generating the U-turn path of the vehicle may calculate the point at which the arc path 603 and the clothoid curve 604 are connected with each other, based on an equation of the arc path 603 and an equation (e.g., Equation 4 above) of the clothoid curve 604, which are calculated according to the calculated center of the arc path 603 and the radius of the arc path 603.

Figure 7:
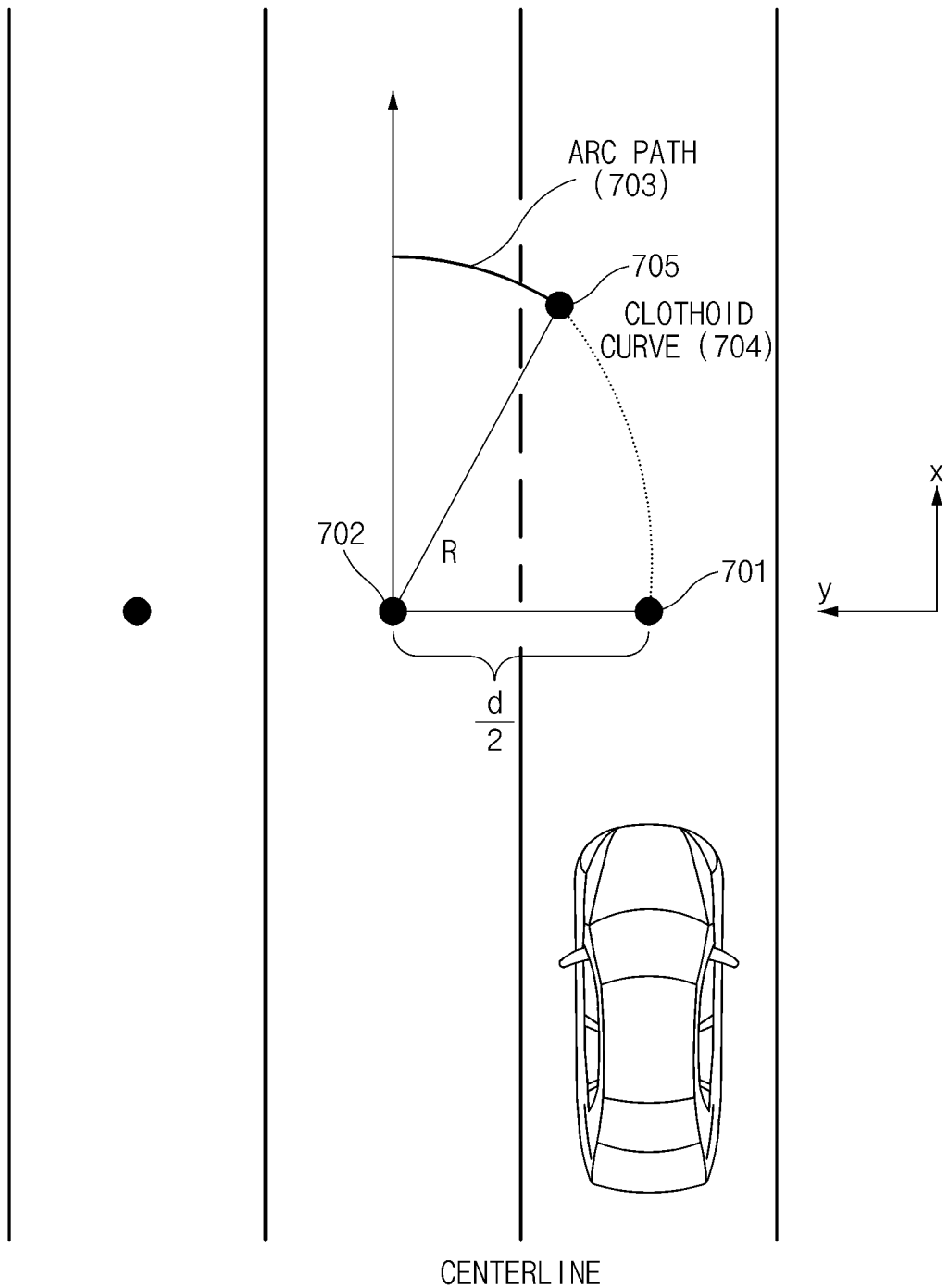
FIG. 7 is a drawing illustrating that an apparatus for generating a U-turn path of a vehicle generates an arc path connected with a clothoid path according to an embodiment of the present disclosure.

FIG. 7 is a drawing illustrating that an apparatus for generating a U-turn path of a vehicle generates an arc path connected with a clothoid path according to an embodiment of the present disclosure.

The apparatus for generating the U-turn path of the vehicle may generate a clothoid curve 704 between a start point 701 of a default U-turn path and a point 705 at which a previously calculated arc path 703 and the clothoid curve 704 are connected with each other.

As an example, the apparatus for generating the U-turn path of the vehicle may generate the clothoid curve 704 between the start point 701 of the default U-turn path and the point 705 at which the arc path 703 and the clothoid curve 704 are connected with each other, by means of Equation 4 above.

The apparatus for generating the U-turn path of the vehicle may generate the arc path 703 in a range where the y coordinate is less than or equal to the y coordinate (d/2) of a midpoint 702 of a segment connecting the start point 701 of the default U-turn path with an end point of the default U-turn path and is greater than or equal to the y coordinate of the point 705 at which the arc path 703 and the clothoid curve 704 are connected with each other.

As an example, the apparatus for generating the U-turn path of the vehicle may generate the arc path 703 by means of Equation 7 below, which is an equation of the arc path 703, which is calculated according to the calculated center of the arc path 703 and the radius of the arc path 703.

$$x = C_x + \sqrt{R^2 - \left(y - \frac{d}{2}\right)^2} \quad \text{[Equation 7]}$$

Herein, x may refer to the x coordinate of the specific point of the arc path 703, $C_x$ may refer to the x coordinate of the center of the arc path 703, R may refer to the radius of the arc path 703, y may refer to the y coordinate of the specific point of the arc path 703, and d may refer to the distance between the start point and the end point of the default U-turn path.

A path in which the arc path 703 and the clothoid curve 704, which are calculated by means of that described with reference to FIG. 7, are added to each other may be a half of the entire default U-turn path.

Figure 8:
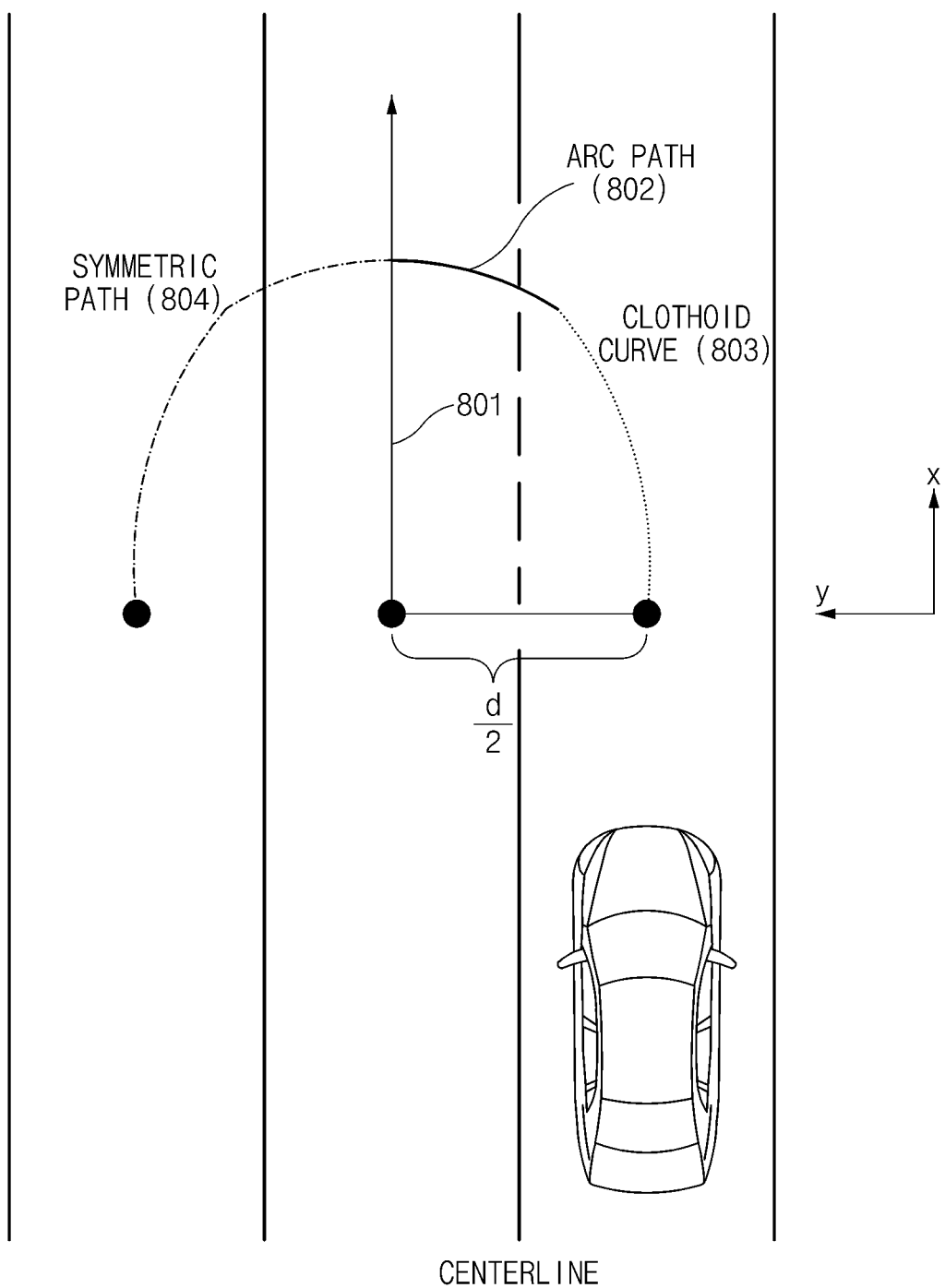
FIG. 8 is a drawing illustrating that an apparatus for generating a U-turn path of a vehicle generates an opposite path symmetrical to a generated half path according to an embodiment of the present disclosure.

FIG. 8 is a drawing illustrating that an apparatus for generating a U-turn path of a vehicle generates an opposite path symmetrical to a generated half path according to an embodiment of the present disclosure.

As an example, the apparatus for generating the U-turn path of the vehicle may first generate half a default U-turn path in a range where the y coordinate is less than or equal to the y coordinate (d/2) of a midpoint between a start point and an end point of a default U-turn path.

As an example, half a default U-turn path may include a clothoid curve 803 and an arc path 802.

The apparatus for generating the U-turn path of the vehicle may generate a symmetric path 804 where half the generated default U-turn path is symmetrical with respect to a straight line 801 where the y coordinate is d/2.

Furthermore, the apparatus for generating the U-turn path of the vehicle may generate a default U-turn path where the clothoid curve 803, the arc path 802, and the symmetric path 804 are added to each other.

Figure 9:
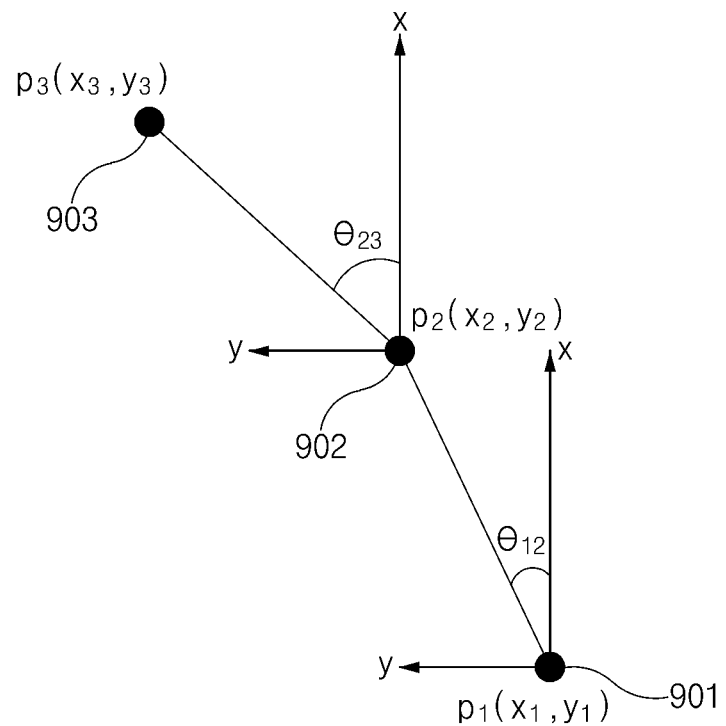
FIG. 9 is a drawing illustrating that an apparatus for generating a U-turn path of a vehicle calculates a heading direction of the vehicle corresponding to a point making up a default U-turn path according to an embodiment of the present disclosure.

FIG. 9 is a drawing illustrating that an apparatus for generating a U-turn path of a vehicle calculates a heading direction of the vehicle corresponding to a point making up a default U-turn path according to an embodiment of the present disclosure.

Point $p_1$ 901, point $p_2$ 902, point $p_3$ 903 may be examples of three points adjacent to each other, which make up a default U-turn path.

The apparatus for generating the U-turn path of the vehicle may calculate a straight slope of a direction towards a next point $p_{i+1}$ adjacent to each point $p_i$ making up the default U-turn path.

As an example, the apparatus for generating the U-turn path of the vehicle may calculate a value, obtained by dividing a difference between the y coordinate of each point $p_i$ and the y coordinate of the next point $p_{i+1}$ adjacent to each point $p_i$ by a difference between the x coordinate of each point $p_i$ and the x coordinate of the next point $p_{i+1}$ adjacent to each point $p_i$, as a slope and may calculate an angle $\theta_{i,i+1}$ which has the calculated slope as a tangent value.

As an example, the apparatus for generating the U-turn path of the vehicle may calculate a straight slope $\tan(\theta_{12})$ in a direction towards point $p_2$ 902 from point $p_1$ 901 and may calculate an angle $\theta_{12}$ corresponding to the slope. As an example, the apparatus for generating the U-turn path of the vehicle may calculate a straight slope $\tan(\theta_{23})$ in a direction towards point $p_3$ 903 from point $p_2$ 902 and may calculate an angle $\theta_{23}$ corresponding to the slope.

As an example, the apparatus for generating the U-turn path of the vehicle may calculate an angle $\theta_2$ indicating a heading direction of a vehicle, which corresponds to point $p_2$ 902, by obtaining an average of the angle $\theta_{12}$ and the angle $\theta_{23}$.

In other words, the apparatus for generating the U-turn path of the vehicle may calculate the angle $\theta_2$ indicating the heading direction of the vehicle, which corresponds to point $p_2$ 902, the angle $\theta_{12}$, and the angle $\theta_{23}$ by means of Equation 8 below.

$$\theta_2 = \frac{(\theta_{12} + \theta_{23})}{2}, \; \theta_{12} = \tan^{-1}\frac{y_2 - y_1}{x_2 - x_1}, \; \theta_{23} = \tan^{-1}\frac{y_3 - y_2}{x_3 - x_2} \quad \text{[Equation 8]}$$

Herein, $x_1$ may refer to the x coordinate of point $p_1$ 901, $y_1$ may refer to the y coordinate of point $p_1$ 901, $x_2$ may refer to the x coordinate of point $p_2$ 902, $y_2$ may refer to the y coordinate of point $p_2$ 902, $x_3$ may refer to the x coordinate of point $p_3$ 903, and $y_3$ may refer to the y coordinate of point $p_3$ 903.

Making generalizations about it, the apparatus for generating the U-turn path of the vehicle may calculate an angle $\theta_i$ indicating the heading direction of the vehicle, which corresponds to point $p_i$, by obtaining an average of the angle $\theta_{i-1,i}$ and the angle $\theta_{i,i+1}$ with respect to any natural number i.

As another example, the apparatus for generating the U-turn path of the vehicle may simply use the angle $\theta_i$ indicating the heading direction of the vehicle, which corresponds to point $p_i$, as the angle $\theta_{-1}$ and the angle $\theta_{+1}$ without change.

Only the three points are exemplified in the present drawing, but calculation described for more number of points making up the default U-turn path may be performed.

Furthermore, as another example which is not illustrated, the apparatus for generating the U-turn path of the vehicle may calculate a slope (or a heading direction) by differentiating a function on a coordinate system indicating the default U-turn path.

Figure 10:
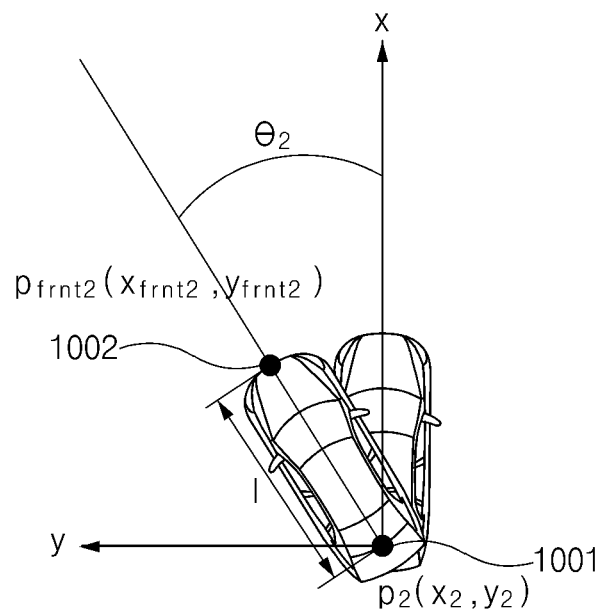
FIG. 10 is a drawing illustrating that an apparatus for generating a U-turn path of a vehicle calculates a point on a final U-turn path corresponding to a point making up a default U-turn path according to an embodiment of the present disclosure.

FIG. 10 is a drawing illustrating that an apparatus for generating a U-turn path of a vehicle calculates a point on a final U-turn path corresponding to a point making up a default U-turn path according to an embodiment of the present disclosure.

The apparatus for generating the U-turn path of the vehicle may calculate point $p_{frnt2}$ 1002 on a final U-turn path, which corresponds to point $p_2$ 1001 making up the default U-turn path.

As an example, the apparatus for generating the U-turn path of the vehicle may determine a point, which is away from point $p_2$ 1001 making up the default U-turn path by a distance I from a rear wheel axle of the vehicle to a front bumper of the vehicle in a heading direction, which is calculated from point $p_2$ 1001 making up the default U-turn path, as point $p_{frnt2}$ 1002 on the final U-turn path, which corresponds to point $p_2$ 1001 making up the default U-turn path.

As an example, the apparatus for generating the U-turn path of the vehicle may calculate point $p_{frnt2}$ 1002 on the final U-turn path, which corresponds to point $p_2$ 1001 making up the default U-turn path, by means of Equation 9 below.

$$x_{frnt2} = x_2 + l \cdot \cos \theta_2$$

$$y_{frnt2} = y_2 + l \cdot \sin \theta_2 \qquad \text{[Equation 9]}$$

Herein, $x_{frnt2}$ may refer to the x coordinate of point $p_{frnt2}$ 1002, $y_{frnt2}$ may refer to the y coordinate of point $p_{frnt2}$ 1002, $x_2$ may refer to the x coordinate of point $p_2$ 1001, $y_2$ may refer to the y coordinate of point $p_2$ 1001, I may refer to the distance from the rear wheel axle of the vehicle to the front bumper of the vehicle, and $\theta_2$ may refer to the angle between the heading direction of the vehicle, which corresponds to point $p_2$ 1001, and the x axis.

Point $p_2$ is exemplified, but the same calculation for point $p_i$ may be performed with respect to any natural number i.

As another example of the apparatus for generating the U-turn path of the vehicle which generates the final U-turn path which is on the basis of another point rather than the center point of the front bumper, distance I may be calculated as another value rather than the distance from the rear wheel axle of the vehicle to the front bumper of the vehicle.

Figure 11:
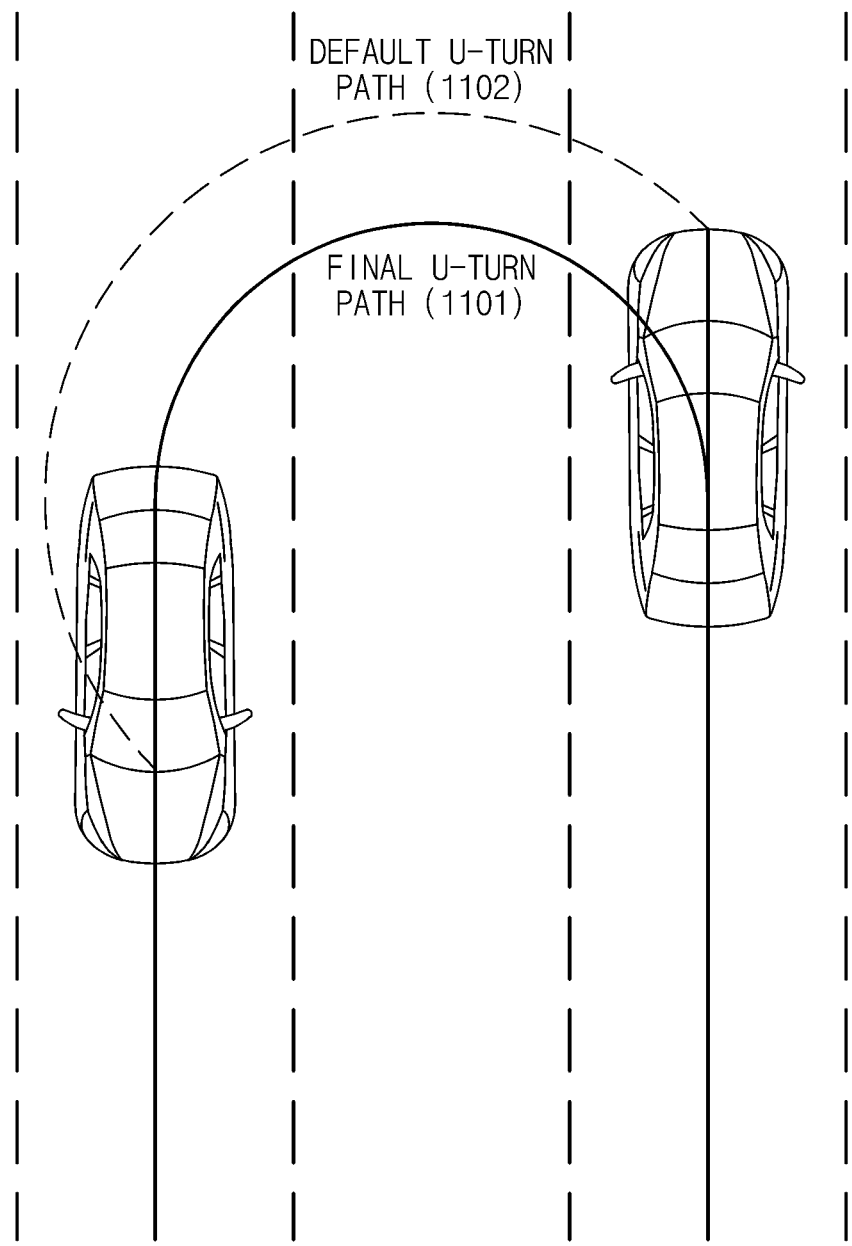
FIG. 11 is a drawing illustrating that an apparatus for generating a U-turn path of a vehicle generates a final U-turn path based on a default U-turn path according to an embodiment of the present disclosure.

FIG. 11 is a drawing illustrating that an apparatus for generating a U-turn path of a vehicle generates a final U-turn path based on a default U-turn path according to an embodiment of the present disclosure.

The apparatus for generating the U-turn path of the vehicle may generate a final U-turn path 1102 corresponding to a default U-turn path 1101.

As an example, the apparatus for generating the U-turn path of the vehicle may allow all points included in the default U-turn path 1101 to correspond to points away from all the points included in the default U-turn path 1101 by a distance from a rear wheel axle of a vehicle to a front bumper of the vehicle in a heading direction.

As an example, the apparatus for generating the U-turn path of the vehicle may generate the final U-turn path 1102 including the points respectively corresponding to all the points included in the default U-turn path 1101.

The apparatus for generating the U-turn path of the vehicle may perform path following control based on the final U-turn path 1102, which is on the basis of the center of the front bumper, rather than the default U-turn path 1101 which is on the basis of the center of the rear wheel axle.

The apparatus for generating the U-turn path of the vehicle may improve performance of path following control by performing the path following control based on the final U-turn path 1102 which is on the basis of the center of the front bumper, which is the same as a reference point of path following lateral control.

Figure 12:
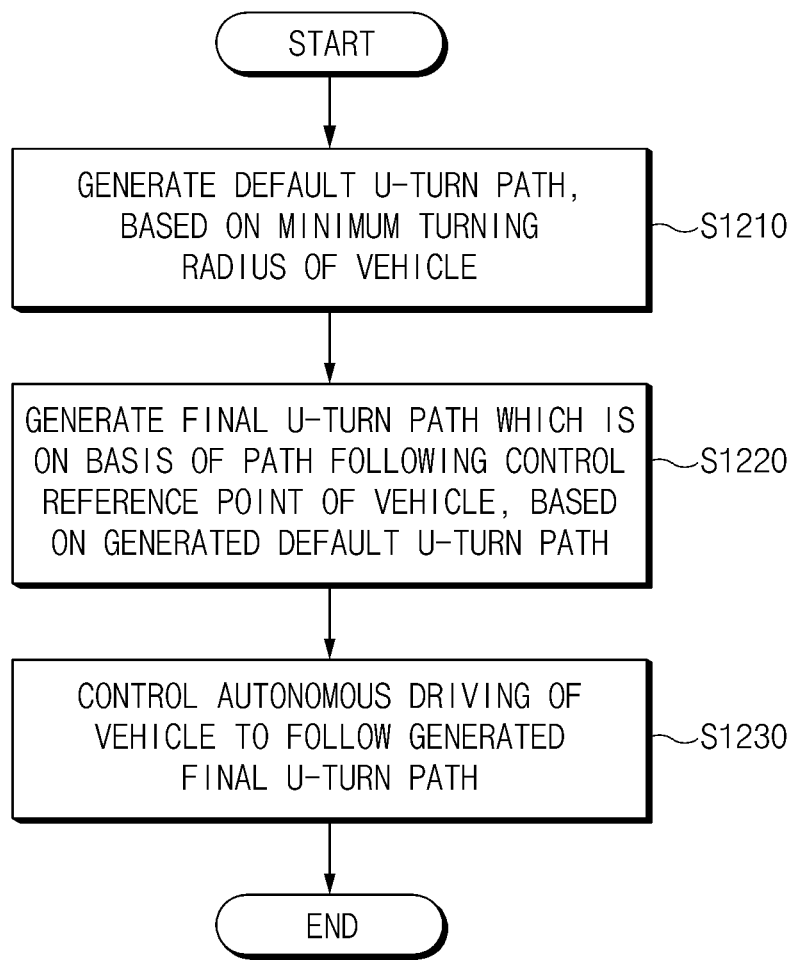
FIG. 12 is a flowchart illustrating a method for generating a U-turn of a vehicle according to an embodiment of the present disclosure.

FIG. 12 is a flowchart illustrating a method for generating a U-turn of a vehicle according to an embodiment of the present disclosure.

Referring to FIG. 12, the method for generating the U-turn of the vehicle may include generating (S1210) a default U-turn path, based on a minimum turning radius of the vehicle, generating (S1220) a final U-turn path which is on the basis of a path following control reference point of the vehicle, based on the generated default U-turn path, and controlling (S1230) autonomous driving of the vehicle to follow the generated final U-turn path.

The generating (S1210) of the default U-turn path, based on the minimum turning radius of the vehicle, may be performed by a path generator provided in the vehicle.

As an example, the generating (S1210) of the default U-turn path, based on the minimum turning radius of the vehicle, may include determining, by the path generator, a section where a U-turn is possible, based on information about a high definition map around the vehicle, and determining, by the path generator, a start point of the default U-turn path, based on the section where the U-turn is possible.

As an example, the generating (S1210) of the default U-turn path, based on the minimum turning radius of the vehicle, may include generating, by the path generator, the default U-turn path, based on the minimum turning radius which is on the basis of the center of a rear wheel axle of the vehicle.

As an example, the generating (S1210) of the default U-turn path, based on the minimum turning radius of the vehicle, may include determining, by the path generator, a lane where the U-turn is ended, based on a lateral distance from a lane where the U-turn is started and the minimum turning radius.

As an example, the generating (S1210) of the default U-turn path, based on the minimum turning radius of the vehicle, may include generating, by the path generator, the default U-turn path including a first clothoid path connected with a start point of the default U-turn path, a second clothoid path connected with an end point of the default U-turn path, and an arc path connected between the first clothoid path and the second clothoid path.

The generating (S1220) of the final U-turn path which is on the basis of the path following control reference point of the vehicle, based on the generated default U-turn path, may be performed by the path generator.

As an example, the generating (S1220) of the final U-turn path which is on the basis of the path following control reference point of the vehicle, based on the generated default U-turn path, may include calculating, by the path generator, a heading direction of the vehicle, which corresponds to a point making up the default U-turn path, calculating, by the path generator, a position of a path following control reference point corresponding to the point making up the default U-turn path, with regard to the heading direction, and generating, by the path generator, the final U-turn path, based on the calculated position of the path following control reference point corresponding to the point making up the default U-turn path.

The controlling (S1230) of the autonomous driving of the vehicle to follow the generated final U-turn path may be performed by a controller.

As an example, the controlling (S1230) of the autonomous driving of the vehicle to follow the generated final U-turn path may include controlling, by the controller, a speed at which the vehicle enters the point where the U-turn is started, with regard to a time taken to maximum steering of the vehicle and a length of the first clothoid path.

As an example, the controlling (S1230) of the autonomous driving of the vehicle to follow the generated final U-turn path may include determining, by the controller, an upper limit of an acceleration of the vehicle for the first clothoid path, with regard to the time taken to the maximum steering of the vehicle, the length of the first clothoid path, and the speed at which the vehicle enters the point where the U-turn is started, and controlling the autonomous driving of the vehicle, with regard to the upper limit of the acceleration.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the apparatus for generating the U-turn path of the vehicle and the method thereof according to an embodiment of the present disclosure.

According to at least one of embodiments of the present disclosure, the apparatus and the method may be provided to generate a U-turn path following during autonomous driving.

Furthermore, according to at least one of embodiments of the present disclosure, the apparatus and the method may be provided to generate a U-turn path considering a kinematic characteristic of an autonomous vehicle.

Furthermore, according to at least one of embodiments of the present disclosure, the apparatus for generating the U-turn path of the vehicle and the method thereof may be provided to match a path generation reference point with a following control reference point.

Furthermore, according to at least one of embodiments of the present disclosure, the apparatus for generating the U-turn path of the vehicle and the method thereof may be provided to enhance path following performance in a process where an autonomous vehicle makes a U-turn.

Furthermore, according to at least one of embodiments of the present disclosure, the apparatus for generating the U-turn path of the vehicle and the method thereof may be provided to improve lateral control following performance by generating a U-turn path considering a minimum turning radius of the vehicle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:
    a path generator provided in a vehicle, the path generator configured to:
        generate, based on a minimum turning radius of the vehicle, a default U-turn path; and
        generate a final U-turn path based on a path following control reference point of the vehicle which is based on the generated default U-turn path; and
    a controller configured to control autonomous driving of the vehicle to follow the generated final U-turn path,
    wherein the path generator is further configured to generate the default U-turn path by connecting a first clothoid path with a start point of the default U-turn path, connecting a second clothoid path with an end point of the default U-turn path, and connecting an arc path between the first clothoid path and the second clothoid path.

2. The apparatus of claim 1, wherein the path following control reference point includes a center point of a front bumper of the vehicle.

3. The apparatus of claim 1, wherein the path generator is configured to:
    determine, based on information from a high definition map around the vehicle, a section where a U-turn is possible; and
    determine, based on the section where the U-turn is possible, the start point of the default U-turn path.

4. The apparatus of claim 1, wherein the minimum turning radius is based on a center of a rear wheel axle of the vehicle.

5. The apparatus of claim 1, wherein the minimum turning radius is based on a maximum steering angle of the vehicle.

6. The apparatus of claim 1, wherein the path generator is configured to determine a lane where a U-turn ends based on a lateral distance from a lane where the U-turn started and the minimum turning radius.

7. The apparatus of claim 1, wherein the minimum turning radius as a radius of the arc path.

8. The apparatus of claim 1, wherein the controller is configured to control a speed at which the vehicle enters a point where a U-turn starts based on a time taken to maximum steering of the vehicle and a length of the first clothoid path.

9. The apparatus of claim 1, wherein the controller is configured to:
    determine an upper limit of acceleration of the vehicle for the first clothoid path based on a time taken to maximum steering of the vehicle, a length of the first clothoid path, and a speed at which the vehicle enters a point where a U-turn starts; and
    control the autonomous driving of the vehicle based on the upper limit of the acceleration.

10. The apparatus of claim 1, wherein the path generator is configured to generate the default U-turn path to be symmetrical to a left and to a right in a lateral direction.

11. The apparatus of claim 1, wherein the path generator is configured to:

calculate a heading direction of the vehicle, the heading direction corresponding to a point making up the default U-turn path;

calculate a position of the path following control reference point corresponding to the point making up the default U-turn path based on the heading direction; and generate the final U-turn path based on the calculated position of the path following control reference point corresponding to the point making up the default U-turn path.

12. A method for generating a U-turn path of a vehicle, the method comprising:

generating, by a path generator provided in the vehicle, a default U-turn path based on a minimum turning radius of the vehicle;

generating, by the path generator, a final U-turn path based on a path following control reference point of the vehicle, based on the generated default U-turn path;

generating the default U-turn path comprises generating, by the path generator, the default U-turn path including a first clothoid path connected with a start point of the default U-turn path, a second clothoid path connected with an end point of the default U-turn path, and an arc path connected between the first clothoid path and the second clothoid path; and controlling, by the controller, autonomous driving of the vehicle to follow the generated final U-turn path.

13. The method of claim 12, wherein generating the default U-turn path comprises:

determining, by the path generator, based on information about a high definition map around the vehicle, a section where a U-turn is possible; and determining, by the path generator, based on the section where the U-turn is possible, the start point of the default U-turn path.

14. The method of claim 12, wherein the minimum turning radius is based on a center of a rear wheel axle of the vehicle.

15. The method of claim 12, wherein generating the default U-turn path comprises determining, by the path generator, a lane where a U-turn ends based on a lateral distance from a lane where the U-turn starts and the minimum turning radius.

16. The method of claim 12, wherein controlling the autonomous driving of the vehicle comprises controlling, by the controller, a speed at which the vehicle enters a point where a U-turn starts based on a time taken to maximum steering of the vehicle and a length of the first clothoid path.

17. The method of claim 12, wherein controlling the autonomous driving of the vehicle comprises:

determining, by the controller, an upper limit of an acceleration of the vehicle for the first clothoid path based on a time taken to maximum steering of the vehicle, a length of the first clothoid path, and a speed at which the vehicle enters a point where a U-turn starts; and controlling, by the controller, the autonomous driving of the vehicle based on the upper limit of the acceleration.

18. The method of claim 12, wherein generating the final U-turn path comprises:

calculating, by the path generator, a heading direction of the vehicle, the heading direction corresponding to a point making up the default U-turn path;

calculating, by the path generator, a position of the path following control reference point corresponding to the point making up the default U-turn path based on the heading direction; and generating, by the path generator, the final U-turn path based on the calculated position of the path following control reference point corresponding to the point making up the default U-turn path.

* * * * *